United States Patent [19]

Schlom et al.

[11] 4,156,351
[45] May 29, 1979

[54] DEPRESSED WET BULB WATER COOLER

[76] Inventors: Leslie A. Schlom, 5524 Saloma Ave., Van Nuys, Calif. 91411; Andrew J. Becwar, 818 Old Landmark La., La Canada, Calif. 91011; Michael B. Dubey, 5518 Saloma Ave., Van Nuys, Calif. 91411

[21] Appl. No.: 796,564

[22] Filed: May 13, 1977

Related U.S. Application Data

[63] Continuation-in-part of Ser. No. 601,873, Aug. 4, 1975, Pat. No. 4,023,949.

[51] Int. Cl.² ............................ F28C 1/00; F28D 5/00
[52] U.S. Cl. ............................................. 62/121; 62/310
[58] Field of Search ................. 62/121, 310, 309, 314, 62/171; 261/133; 165/60

[56] References Cited

U.S. PATENT DOCUMENTS

| | | | |
|---|---|---|---|
| 2,488,116 | 11/1949 | Berlowitz | 62/310 |
| 3,214,936 | 11/1965 | Di Peri | 62/310 |
| 4,002,040 | 1/1977 | Munters | 62/121 |

*Primary Examiner*—Lloyd L. King
*Attorney, Agent, or Firm*—Nilsson, Robbins, Dalgarn, Berliner, Carson & Wurst

[57] ABSTRACT

A depressed wet bulb water cooler utilizing an indirect evaporating film heat exchanger having walls defining wet and dry sides. In a particular embodiment, the wet and dry sides are formed respectively as the opposite inner and outer surfaces of elongated hollow tubular conduits. Water from a load is applied across the inner wet side surfaces while intake air is drawn across the outer, dry side surfaces so as to cool the intake air to a first temperature. The cooled air is then flowed as working air at substantially the first temperature over the wet side of the conduits, and discharged.

17 Claims, 7 Drawing Figures

DEPRESSED WET BULB WATER COOLER

CROSS REFERENCE TO RELATED APPLICATION

This application is a continuation-in-part of U.S. patent application Ser. No. 601,873, filed Aug. 4, 1975 entitled "EVAPORATIVE REFRIGERATION SYSTEM" now U.S. Pat. No. 4,023,949.

FIELD OF THE INVENTION

The field of art to which this invention pertains includes the field of water cooling systems, more specifically the field of evaporative water cooling systems.

BACKGROUND AND SUMMARY OF THE INVENTION

The typical water cooler is in the form of a tower and operates solely by latent cooling in which a portion of the water is evaporated by flowing ambient air either over or through the water. The evaporation process will extract approximately 1000 b.t.u's per pound of water evaporated so that the lowest (final) water temperature which can be obtained is limited by the wet bulb temperature of the air in which the evaporation process is taking place. Thus in common practice, the amount of water consumed in the evaporation process and the lowest temperature obtained by the evaporating water is a function of the ambient conditions under which the process is taking place and is governed solely by the wet bulb temperature of the ambient air.

This invention offers a significant improvement over the system above described, enabling the processed water to be brought to a lower final temperature by depressing the wet bulb temperature of the air utilized during the evaporation process.

More specifically, a depressed wet bulb water cooler is provided with heat exchange walls having opposite exposed surfaces defining wet and dry sides. Water from a load (i.e., water to be cooled) is applied across the wet side surfaces so as to provide extended films of water thereon. Ambient air is flowed into thermal conductive contact with the dry side surfaces thereby cooling the air. The thus cooled air is then used as the working air. It is brought directly to the wet side so that it is applied to the wet side at substantially the temperature to which it was cooled. The cool air flows over the wet side, evaporating portions of water on the wet side surfaces, thereby moistening the air, cooling the water and cooling the wet and dry side surfaces. The moistened air is discharged and cooled water is recovered from the wet side.

By using dry (sensibly) cooled air as the working air, a lower wet bulb temperature is achieved than would be otherwise obtainable if the air were merely drawn upwardly through the hollow conduits directly from the outside.

In particular embodiments the heat exchange walls are formed as an array of elongated, vertically directed conduits. Headers are provided on opposite sides of the conduit array to isolate the spaces between the conduits. The headers facilitate application of the load water at the top entrance apertures of the conduits for flowing therethrough by the force of gravity, while the working air is flowed countercurrently to the water flow.

In a further embodiment, means are provided for pre-cooling of the water used during the evaporation process. Not only does this enhance the ability of the cooler to achieve a lower water temperature, but by the removal of heat from the water prior to the evaporation process, less water is evaporated thereby conserving water. Pre-cooling is accomplished by flowing the working air in thermal conductive contact with a secondary heat exchanger through which the water is flowing prior to its being used in the evaporation process.

DETAILED DESCRIPTION

As required, a detailed illustrative embodiment of the invention is disclosed herein. The embodiment exemplifies the invention and is currently considered to be the best embodiment for such purposes. However, it is to be recognized that the cooler may be constructed in various other forms different from that disclosed. Accordingly, the specific structural details disclosed herein are representative and provide a basis for the claims which define the scope of the present invention.

As above indicated, the cooler (which can also be referred to as a "cooling tower") disclosed herein utilizes an indirect evaporating film heat exchanger having walls which define wet and dry sides formed as the inner and outer surfaces of elongated vertically disposed hollow tubular conduits. Water to be cooled is isolated from the ambient air until it has been pre-cooled by being drawn across the outer surfaces of the tubular conduits through a process to be explained hereinbelow. The thus cooled air is then used as working air and is flowed upwardly through the tubular conduits, the inner surfaces of which contain downwardly flowing water. The evaporation of the flowing water in the countercurrently flowing working air cools the conduit inner surfaces, and through thermal conduction within the conduit material, cools the conduit outer surfaces which in turn cools the entering ambient air as described above. The lower temperature of the working air prior to the evaporating process provides it with a lower wet bulb temperature than it would otherwise have if it were utilized directly from the outside without pre-cooling. In a further improvement, the load water can be pre-cooled by secondary heat exchange with the discharged moistened working air.

Figure 1:
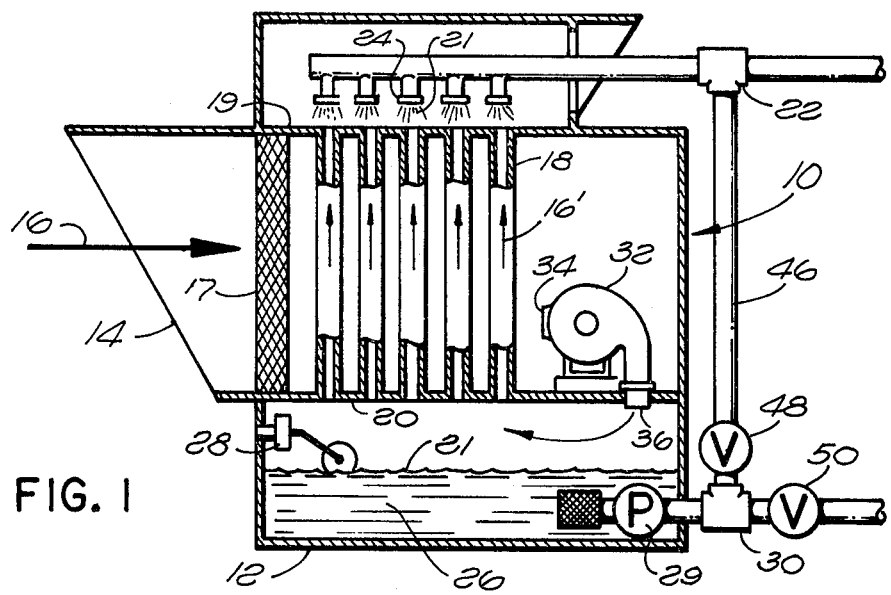
FIG. 1 is a diagrammatic view of a depressed wet bulb cooler constructed in accordance with the present invention.

Referring to FIG. 1, a depressed wet bulb cooler 10 is shown including a housing 12 which defines an entrance port 14 for the introduction of ambient air 16 past a filter 17. An array of vertically directed, hollow, elongated tubular conduits 18 are stacked between top and bottom headers 19 and 20. Water 21, supplied via a water input duct 22, is discharged into the conduits 18 through nozzles 24 positioned at the top of the conduit array. The discharged water 21 flows into a reservoir 26 therefor defined at the bottom of the housing 12. The reservoir water 21 is maintained at a predetermined level by a ball-flow valve 28 through which water will flow from an external supply (not shown) whenever the reservoir water drops below a predetermined level. Water can be removed from the reservoir 26 via a duct 30 either through gravity flow or with a pump 29.

A blower 32 is located downstream of the conduits 18 and includes an input port 34 and output port 36. Ambient air is drawn by the blower 32 into the cooler and across and in thermal conductive contact with the outer surfaces of conduits 18. It is preferred to draw rather than push the ambient air across the outer surfaces of the conduits 18 as such provides the most uniform air distribution without recourse to baffles, static plates or other such devices which would introduce additional resistance to air flow in the cooler.

Figure 2:
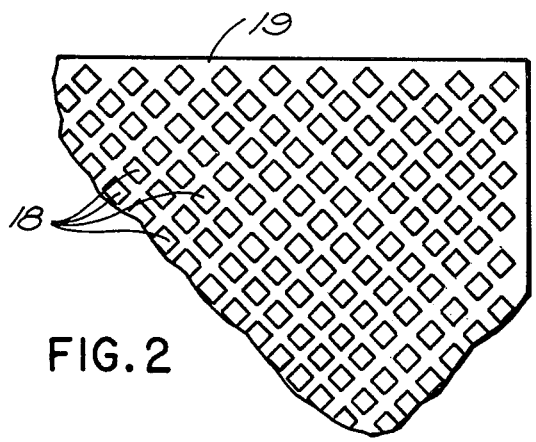
FIG. 2 is a plan view of a portion of the heat exchanger conduit array and header of FIG. 1.
Figure 3:
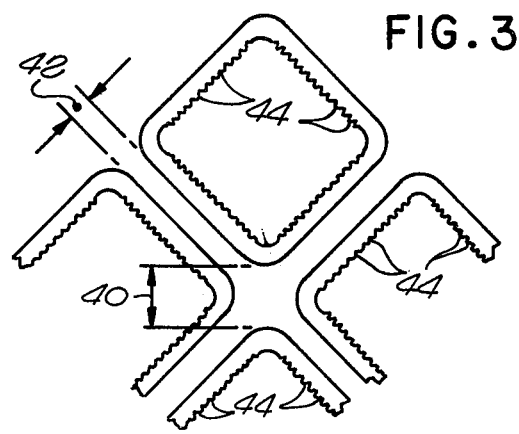
FIG. 3 is an enlarged view of a portion of FIG. 2 below the header.

Details of construction of the array of tubular conduits 18 can be found in our prior application Serial No. 601,873, and are shown in FIGS. 2 and 3. The tubular conduits 18 are substantially square in external cross-sectional configuration, but are formed with substantially rounded corners. By using squared conduits, an array matrix can be obtained that permits greater external surface area than other configurations. The extent of spacing between the conduits is chosen so as to obtain the desired flow rate of ambient air on the dry side. Referring in particular to FIg. 3, in the specific configuration illustrated, the distance 40 between diagonally adjacent conduits is about twice the distance 42 between laterally adjacent conduits. In general, the distances chosen with respect to any particular size conduit should be such as to permit the desired flow rate in the free area between the conduits. Preferably, the external side dimension of each conduit is greater than three times the external distance between laterally adjacent conduits and a ratio of about 5.6 is illustrated in FIG. 3.

Referring particularly to FIG. 2, a portion only of the top header 19 is illustrated and the specific conduit array illustrated is comprised of 449 conduits arranged in 12 rows of 20 conduits each alternating with 11 rows of 19 conduits each. The particular conduits illustrated are formed of organic plastic material and each has a wall thickness of 0.03-0.04 inch. With the specific array illustrated, and an external side dimension of 1.25 inch, lateral distance between conduits of 0.225 inch and diagonal distance between conduits of 0.45 inch, the ambient air "sees" a dry side free area of 1.79 square feet.

Again referring particularly to FIG. 3, the inner surfaces of the conduits 18 are formed with longitudinal grooves 44 which parallel the flow of water 21 and working air 16'. The grooves 44 serve to draw and spread the water by capillary action to wet the inner conduit surfaces, providing a uniform film to enhance evaporation. As an alternative to the grooves 44, or in addition thereto, the inner surfaces of the conduits can be made hydrophilic by various treatments as set forth in our copending application filed concurrently herewith, entitled EVAPORATIVE COOLING USING HYDROPHILIC SURFACES Ser. No. 796,562.

Ambient intake air 16 which is to become the working air 16' flows across the dry outer surfaces of the conduits 18. As the cooled air exits the blower output port 36 it is directed to the top of the water reservior 26 so as to be forced upwardly as working air 16' through the conduits 18. The dry side air is thus flowed directly to the wet side at substantially the temperature it achieved exiting from the dry side. As the working air 16' is forced upwardly, the water 21 to be cooled is discharged through the nozzles 24 and flows downwardly along the inner, wet side surfaces of the conduits 18. The working air 16' flows countercurrently to the flow of water 21 so that portions of the water are evaporated in the working air 16', thus moistening the working air 16' and lowering the temperature of the water 21 and the inner and outer surfaces of the conduits 18. The lower temperature of the outer surfaces of the conduits 18 in turn reduces the temperature of the air 16 being drawn across the outer surfaces so that sensibly cooled air is supplied as working air 16' to the wet side of the heat exchanger. Cooling of the intake air 16 on the dry side of the heat exchanger results in a lower wet bulb temperature when it is flowed upwardly as working air 16' and therefore allows the evaporating water flowing downwardly along the inner surfaces of conduits 18 to obtain a temperature lower than that achievable upwardly with flowing ambient air.

As an example of the efficiency which is achievable with the above described cooler, assume the temperature of the ambient air is 93° F. dry bulb and 70° F. wet bulb. In a conventional water cooler the cooling process would take place psychrometrically on the 70° F. wet bulb line with 70° F. being the lowest obtainable temperature for the water being cooled. Utilizing the invention described hereinabove, the ambient air is brought into the cooler 10 in which the wet and dry airstreams are separated. As the water on the inner surfaces of the conduits 18 evaporates, the outside surfaces of the conduits 18 are cooled and the ambient air 16, by passing in thermal conductive contact therewith, is cooled. Assuming a heat exchange efficiency of 80%, under the conditions described above the ambient air will enter the blower input 34 at a dry bulb temperature of 74.6° F. Since this cooling process is sensible, i.e., no moisture is added as a result thereof, the wet bulb temperature of the air will be lowered correspondingly from 70° F. to 64.6° F. As this cooler air 16' is forced upwardly through the tubular conduits 18, the evaporation process will be now taking place at a wet bulb temperature of 64.6° F.

Referring again to FIG. 1, a duct 46 for directly interconnecting the water removal duct 30 with the water input duct 22 is provided. Water flowing through the interconnecting duct 46 and through the water removal duct 30 is controlled by valves 48 and 50 located within each duct. Opening of the interconnecting duct valve 48 (and possibly closing the water removal duct valve 50) allows the water removal pump 29 to transfer water 21 directly from the reservoir 26 to the water discharge nozzles 24. Operation of the cooler in this configuration results in iteration of the process. With the water removal duct valve 50 closed, and no other supply water introduced, the evaporative process takes place during the first interation at a wet bulb temperature of 64.6° F. instead of the 70° F. at which the process initially began. The ambient air is then seeing a temperature differential of 28.4° F. (93°–64.6°) between it and the outer surfaces of conduits 18. Since the heat exchanger is 80% efficient, the new working air temperature subsequent to passing over the outer surfaces of conduits 18 is 70.3° F. dry bulb and 63.8° F. wet bulb. At this point the iteration process essentially reaches equilibrium with the working air entering the conduits 18 prior to the evaporation process at a temperature of approximately 64° F. wet bulb or a depression of 6° F. below the 70° F. wet bulb temperature under which a conventional water cooler would be performing.

Figure 4:
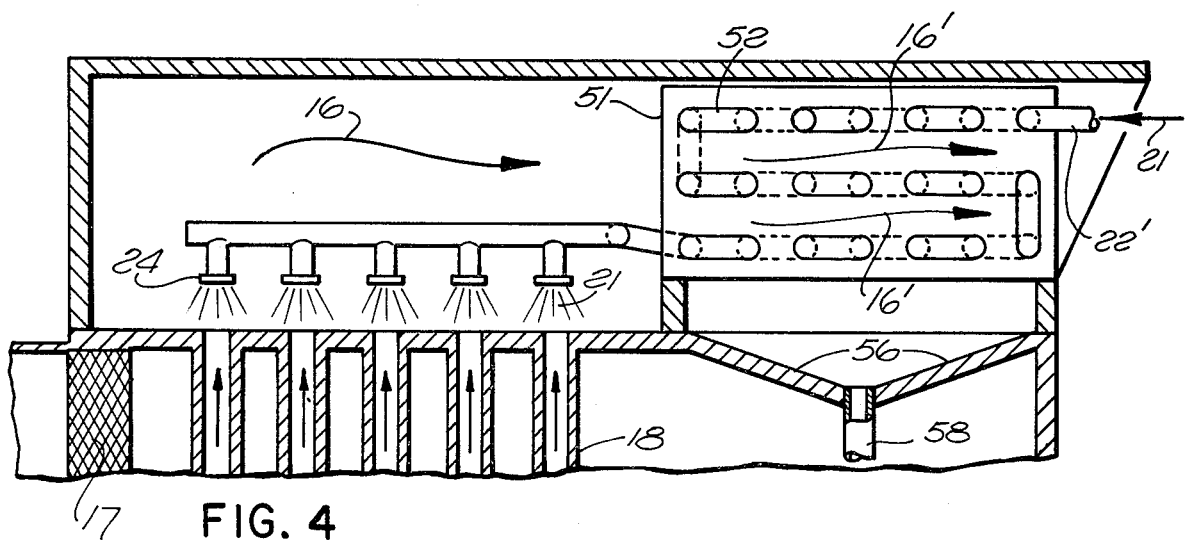
FIG. 4 is a diagrammatic elevational view showing incorporation of a secondary heat exchanger through which the water flows prior to the evaporation process.

The invention as previously described represents a significant advance over the existing state of the art in water coolers. However, to enhance its performance and reduce water consumption, a further embodiment of the invention utilizes a finned secondary heat exchanger 51 similar to that utilized in automobile radiators for precooling the water 21 prior to discharge through the nozzles 24. The further embodiment can be understood by referring to FIG. 4 showing incorporation of the secondary heat exchanger 51 through which the water 21 from a load flows prior to the evaporation process. The cooler of FIG. 4 is the same as that shown in FIG. 1 with the addition of the secondary heat exchanger coils 52. In operation, the water 21 to be cooled enters the cooler through a water input duct 22' as in the first embodiment. The water then flows through the secondary heat exchanger coils 52 and is discharged through the nozzles 24 for flow down the inner surfaces of conduits 18. The working air 16' flowing upwardly through conduits 18, and thereby being cooled by evaporation from water flowing downwardly through conduits 18, is forced by the blower 32 (FIG. 1) to flow in thermal conductive contact with the secondary heat exchanger coils 52 prior to being exhausted to the outside atmosphere. The load water is thus cooled by heat exchange with the discharged working air 16'. Water condensation on the secondary heat exchanger coils 51 drips onto inclined collecting surfaces 56 and flows into a water return duct 58 which discharges into the water reservoir 26.

The advantages of precooling the load water can be exemplified by considerating of a typical refrigeration of process cooling application in which water is returned to the cooler at a temperature between 90° F. and 105° F. Since the working air is near its wet bulb temperature (which in the case of the preceding example would be approximately 64° F.) the temperature differential between the water returning to the cooling tower and the working air would range between 26° F. and 41° F. for the examples shown. With a heat transfer efficiency of 40% for the secondary heat exchanger, the working water prior to its introduction to the tubular conduits 18 will be reduced in temperature approximately 10° F. to 16° F., for input water temperatures between 90° F. and 105° F. This cooler has significant advantages over a cooler not incorporating a secondary heat exchanger. One advantage is that the water passing through the water input duct 22' raises the temperature of the discharged moistened working air and minimizing or even eliminating a common water cooler problem of "steaming" which can cause damage as a result of moisture condensation.

Another advantage to using the secondary heat exchanger is that it will act as a moisture remover and minimize the blow-out of moisture droplets in the discharged air 16' by the retention of droplets on the coils 52 permitting moisture-free air 16' to be discharged. The droplets increase the heat transferability of the coils 52 and provide a further evaporative cooling effect which decreases the temperature of the water flowing through the water input duct 22'. In addition cooling the water flowing through the water input duct 22' and the secondary heat exchanger coils 52 reduces the overall cooling required through evaporation of water from the inner surfaces of conduits 18. Reduction in this cooling load requirement increases the effectiveness of cooling occurring within conduits 18 and further reduces the temperature of the working air being cooled. Further reduction in the temperature of the working air further cools the water passing through the water input duct 22' thus resulting in a "boot-strapping" effect which provides both high efficiency and low water consumption.

Figure 6:
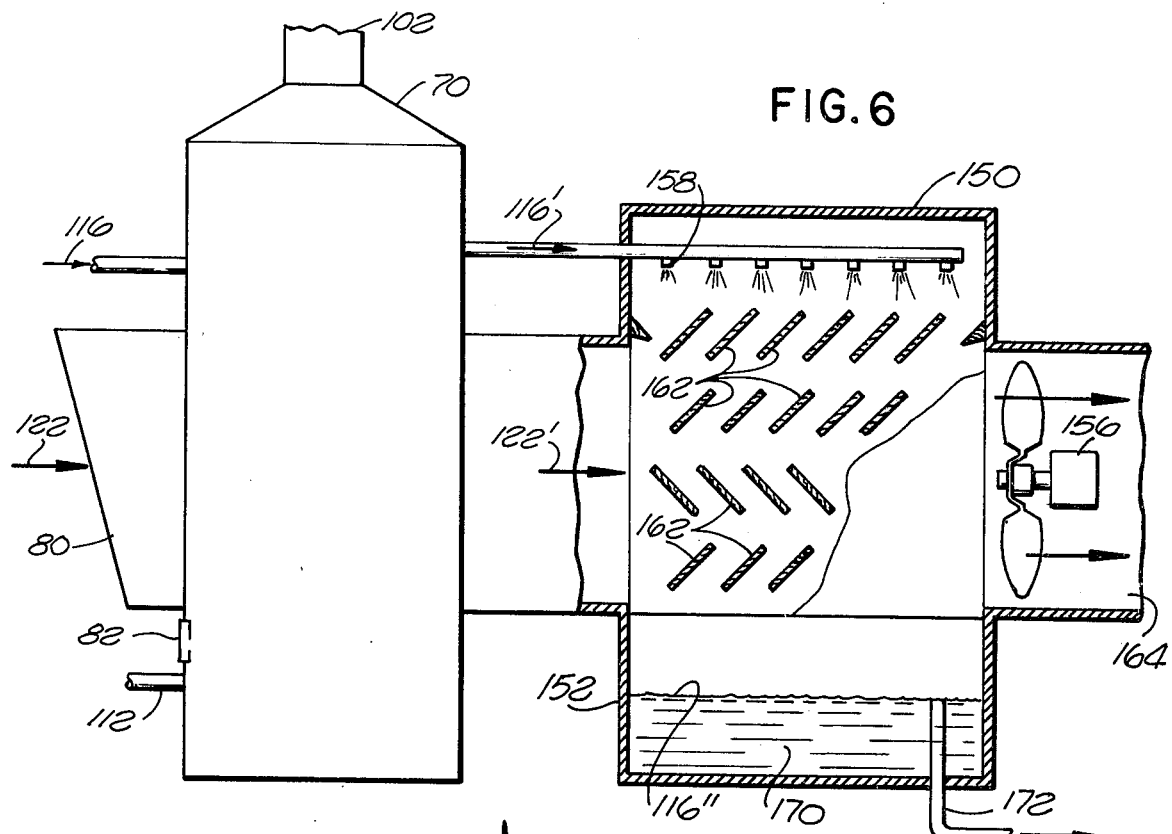
FIG. 6 is a diagrammatic elevational view showing a heat exchanger which pre-cools input water and air for use in a water tower.
Figure 7:
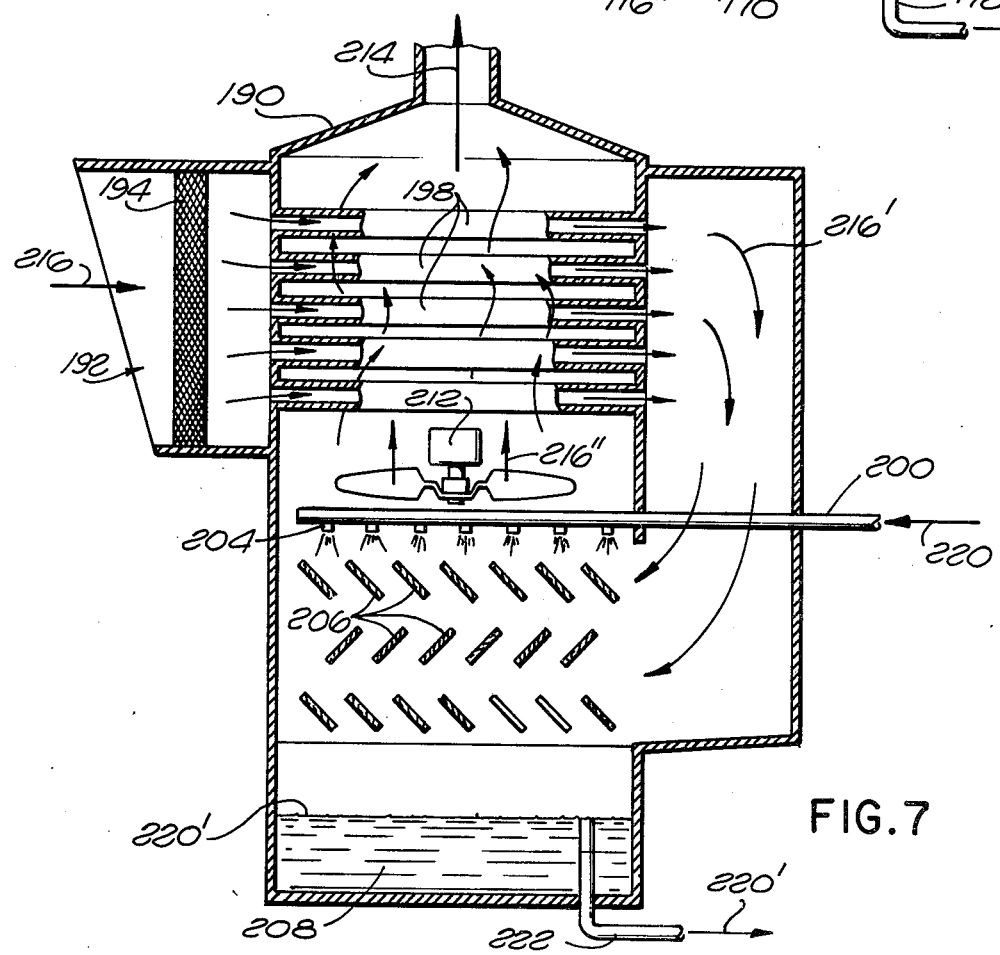
FIG. 7 is a diagrammatic elevational view showing a modified water tower in which dry input air is pre-cooled by cool moist exhaust air.

The basic wet bulb coolers shown in FIGS. 1 and 4 can be configured in many different ways to enhance evaporative water cooling efficiency. Three such configurations are shown in FIGS. 5, 6 and 7.

Figure 5:
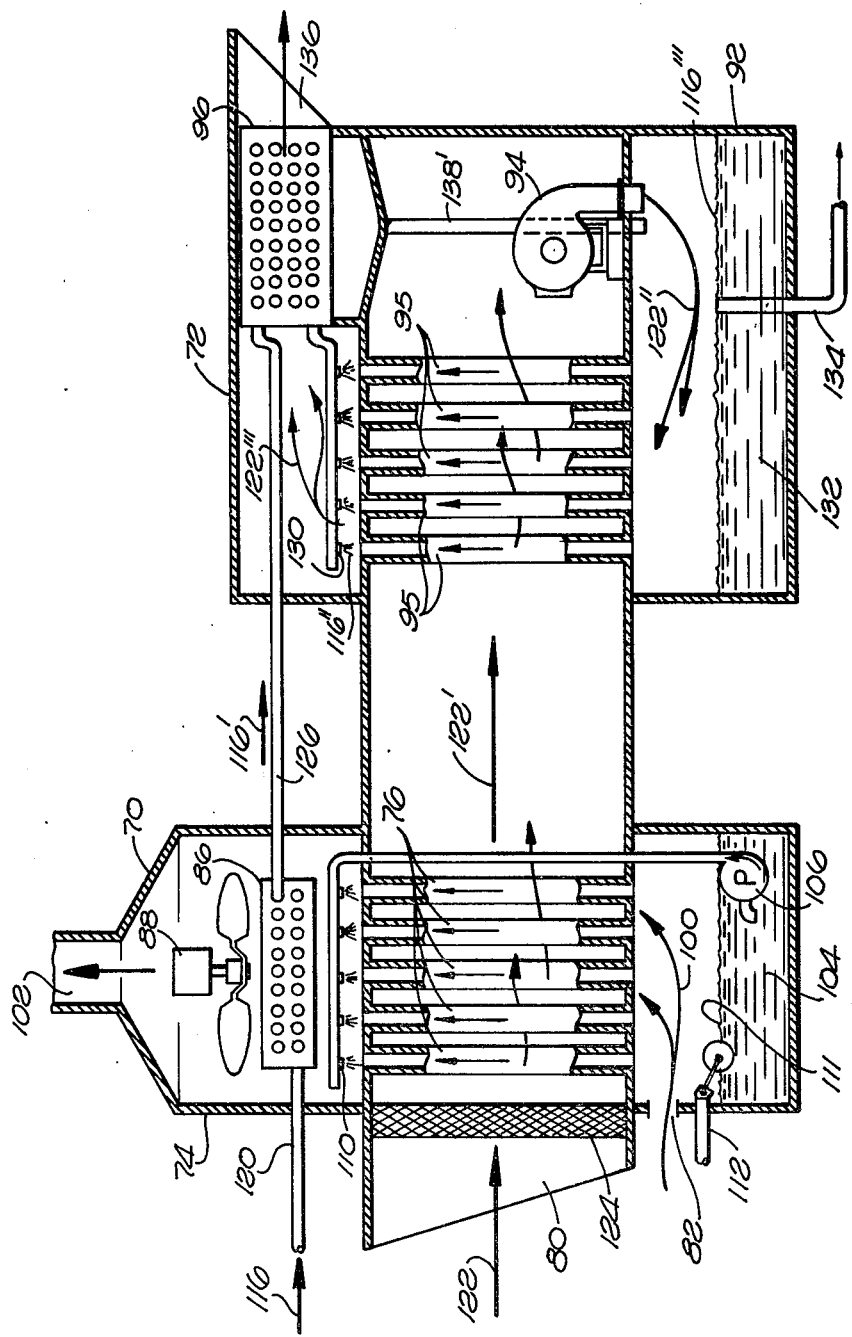
FIG. 5 is a diagrammatic elevational view showing two heat exchangers in parallel, the cooled water and working air output of the first heat exchanger to be utilized by the second heat exchanger.

FIG. 5 illustrates an embodiment which utilizes two heat exchangers 70 and 72 which are connected in parallel as explained below. The first heat exchanger 70 consists of a housing 74, tubular conduits 76, dry side air input duct 80, wet side air input duct 82, first secondary heat exchanger 86, and moist air exhaust fan 88. The second heat exchanger 72 consists of a housing 92, blower 94, tubular conduits 95 and second secondary heat exchanger 96.

Operation of the first heat exchanger 70 is similar to that of the one shown in FIG. 1. Wet side air 100 is drawn through the wet side air input duct 82 and flowed upwardly through the tubular conduits 76 by the moist air exhaust fan 88 and is discharged through an exhaust port 102. Water is drawn from a reservoir 104 by a pump 106 and discharged through nozzles 110 for downward flow along the inner surfaces of the tubular conduits 76 as previously explained. The water level 111 in the reservoir is maintained by a ball-float valve 112 which controls a water input source (not shown). Evaporation of downwardly flowing water from the inner surfaces of the tubular conduits 76 cools the wet side air 100 which then passes through the first secondary heat exchanger 86 and precools working water 116 which enters the first secondary heat exchanger 86 coils through an input duct 120. The thus cooled working water 116 is discharged from the first secondary heat exchanger 86 at a first cooled temperature 116' and flows through a conduit 126 connecting the output of the first secondary heat exchanger 86 with the input to the second secondary heat exchanger 96. Dry side air 122 is drawn through the dry side input duct 80, a filter 124 and across outer, dry side surfaces of the tubular conduits 76 by the blower 94 located in the second heat exchanger 72.

The cooled dry side air 122' is drawn into the second heat exchanger 72 and across outer dry side surfaces of the tubular conduits 95 contained therein also by the blower 94 located in the second heat exchanger 72. The further cooled dry air 122" after passing over the outer surfaces of the conduits 95 is pushed upwardly through the conduits 95 where it is cooled to a third cooled temperature 122''' by a process to be explained below. The third cooled air 122''' is then forced through the second secondary heat exchanger 96 by the blower 94 where it is used to further cool the working water 116' flowing through coils contained within the second secondary heat exchanger 96. The further cooled water 116″ is discharged through water discharge nozzles 130 located above the tubular conduit 95 entrance apertures for downward flow along the inner wet side surfaces of the tubular conduits 95. Evaporation of the further cooled water 116″ while flowing along the inner surfaces of the conduits 95 provides the cooling for the cooled dry side air 122′ by thermalconductive flow through the conduit 95 walls and for the further cooled dry side air 122″ as the water evaporates therein. The further cooled working water 116″ as it flows downwardly through the conduits 95 and evaporates, is cooled to a third cooled temperature 116‴ and collected in a reservoir 132 where it is drawn off by a water overflow duct 134 whenever the water level exceeds that of the duct 134 entrance aperture. The third cooled air 122‴ after passing through the second secondary heat exchanger 96, is discharged through an exhaust port 136. Water condensation from the second secondary heat exchanger 96 is collected and returned to the second heat exchanger reservior 132 through a return duct 138.

FIG. 6 illustrates an embodiment in which a heat exchanger 70 identical to as the first heat exchanger 70 in FIG. 5 is used to supply input air 122′ and input water 116′ to a water cooling tower 150 consisting of a housing 152, fan 156, water discharge nozzles 158, baffles 162 and an air exhaust port 164. The precooled input air 122′ from the heat exchanger 70 is drawn substantially horizontally across the baffles 162 by the cooling tower fan 156 and exhausted through an exhaust port 164. The precooled input water 116′ is discharged through the water discharge nozzles 158 located above the baffles 162 and flows downwardly along the baffle 162 surfaces to a collection reservior 170. Evaportion of the descending water 116′ into the orthogonally flowing precooled dry air 122′ further cools the water 116″ which is contained in the reservoir 170. The thus further cooled water 116″ is removed from the collection reservoir 170 via an overflow duct 172.

FIG. 7 illustrates another embodiment of the invention which utilizes a heat exchanger in conjunction with a water cooling tower. The combined heat exchanger and water cooling tower 190 comprises an air input port 192, air input filter 194, horizontally directed tubular conduits 198, water input duct 200, water discharge nozzles 204, baffles 206, cooled water reservoir 208, fan 212 and air exhaust port 214. In operation, air 216 is drawn by the fan 212 through the air input port 192 and filter 194, through and across the inner surfaces of the horizontally directed tubular conduits 198 and across the baffles 206. By a process to be explained below, the input air 216 is cooled to a first temperature 216′ as it passes through the conduits 198 and cooled to a second temperature 216″ as it passes across the baffles 206. The fan 212 then pushes the twice cooled air 216″ upwardly across and in thermal conductive contact with the outer surfaces of the tubular conduits 198 and through the air exhaust port 214. Water 220 enters through the water input duct 200 and is discharged through nozzles 204 located above the surfaces of the baffles 206. As the water 220 flows downwardly over the baffle 206 surfaces, it evaporates thus cooling both the upwardly flowing air from a first cooled temperature 216′ to a second cooled temperature 216″ and the downwardly flowing water to a first cooled temperature 220′ which is collected in the cooled water reservoir 208. The twice cooled air 216″ which flows upwardly across the outer surfaces of the tubular conduits 198, cools the inner surfaces of the conduits 198 by thermal conduction therethrough, thereby cooling the input air 216 to the first cooled temperature 216′ as it flows through the tubular conduits 198. The cooled water 220′ is removed from the reservoir 208 by an overflow duct 222.

The cooler of this invention is particularly useful in a locale having a combination of high daytime temperatures, low relative humidity and a high day-night temperature range. Under such circumstances this invention can be used nocturnally to cool a reservoir of water which can be used the next day for air conditioning applications. As an example, with outside air conditions of 100° F. dry bulb temperature, 2% relative humidity and a 30° F. daily temperature range, a unit constructed in accordance with this invention can produce, at nighttime, water at a temperature below 55° F. This water could then be utilized the next day for air conditioning applications without the need for compressors as required with conventional cycle refrigeration systems. In this application, the cooler would be consuming energy at late night and as such would not only reduce the overall energy which would otherwise be utilized by a conventional cycle air conditioning system but would also reduce the peak demand of the energy during daytime hours and thereby help to flatten the overall energy demand curve.

The cooler of this invention also conserves water. Since a reduced water temperature is obtained over previous coolers, it will result in a reduction in the quantity of cooling water required for any given cooling application. As a result of this reduction, savings can be realized in reducing water quantities required, lower pumping costs, and lower piping costs. In refrigeration applications where the water cools the working gas being compressed by the refrigeration pump, use of the cooler of this invention will result in a lower pump pressure requirement and therefore a lower energy requirement for the pump.

What is claimed is:
1. A depressed wet bulb water cooler, comprising:
   walls formed as an array of elongated, vertically directed conduits having exposed inner and outer surfaces defining respectively an evaporative cooling wet side for latent cooling of air and a dry side for sensible cooling of air;
   water discharge means for applying discharge water to the upper inner surfaces of said conduits;
   means for flowing air into thermal conductive contact entirely across said dry side surface to cool said air to a first temperature, and then flowing all of said cooled air at substantially said first temperature over said wet side surface whereby to evaporate portions of water on said wet side surface to thereby moisten said air, cool said water and cool said wet and dry side surfaces;
   top and bottom headers on opposite sides of said conduit array, isolating the spaces between said conduits from air delivered for flow through said conduits;
   means for recovering cooled water from said wet side surfaces; and
   means for discharging said moistened air.
2. The cooler of claim 1 wherein said walls define said wet and dry sides as opposite sides of said wall.
3. The cooler of claim 2 wherein said walls are formed as an array of spaced, hollow, elongated conduits defined by said wet and dry side surfaces as inner and outer surfaces, respectively, the flow cross section extending between the surfaces comprising the dry side being substantially uniform.

4. The cooler of claim 2 wherein said walls are formed as an array of elongated, vertically directed conduits and said water discharge means is formed to apply water to the upper inner surfaces of said conduits, said water flowing down the inner surfaces of said conduits to wet said surfaces.

5. The cooler of claim 4 in which said air flowing means comprises means for directing the flow of said air countercurrently to flow of said water.

6. The cooler of claim 4 including top and bottom headers on opposite sides of said conduit array, isolating the spaces between said conduits from air delivered for flow through said conduits.

7. The cooler of claim 6 wherein said discharge means comprises means for distributing said water onto said top header for flow into said conduits to wet said inner surfaces whereby to provide an extended film thereon to enhance the effects of evaporation.

8. The cooler of claim 1 in which said water recovering means comprises storage means for said cooled water.

9. The cooler of claim 8 including means for selectively transferring stored cooled water to said water discharge means whereby to further cool said discharge water.

10. The cooler of claim 8 including means for adding uncooled water to the cooled water in said storage means until said storage means contains a predetermined amount of water.

11. A depressed wet bulb water cooler, comprising:
walls having exposed surfaces defining respectively an evaporative cooling wet side for latent cooling of air and a dry side for sensible cooling of air;
water discharge means for applying discharge water across said wet side surface;
means for flowing air into thermal conductive contact entirely across said dry side surface to cool said air to a first temperature, and then flowing all of said cooled air at substantially said first temperature over said wet side surface whereby to evaporate portions of water on said wet side surface to thereby moisten said air, cool said water and cool said wet and dry side surfaces;
means for recovering cooled water from said wet side surfaces;
means for discharging said moistened air;
a secondary heat exchanger having interconnected elongated conduits with an input port and an output port;
means for supplying water to said input port;
means for connecting said output port with said water discharge means; and
means for directing said moistened discharged air around said interconnected conduits whereby to precool water supplied to said wet side surface and to recover some of the water carried in said discharged air whereby to remove heat from the water prior to it being discharged.

12. A depressed wet bulb water cooler, comprising:
a housing;
heat exchange walls formed as an array of elongated, vertically directed conduits within said housing having exposed inner and outer surfaces defining respectively wet and dry sides;
water discharge means within said housing for applying water to the upper inner surfaces of said conduits whereby to provide an extended film of water on the inner surfaces of said conduits;
means entirely within said housing for flowing air into thermal conductive contact entirely across said dry side surface, and then flowing all of said air over said wet side surface to thereby moisten said air, cool said water and cool said wet and dry side surfaces;
top and bottom headers on opposite sides of said conduit array, isolating the spaces between said conduits from air delivered for flow through said conduits;
means for recovering cooled water from said wet side surface; and
means for discharging said moistened air.

13. A method for cooling water, comprising:
discharging water across the wet side of a heat exchanger having heat exchange walls formed as an array of elongated, vertically directed conduits with exposed inner and outer surfaces defining respectively wet and dry sides;
flowing air entirely across said dry side surface to cool said air to a first temperature and then flowing all of said cooled air at substantially said first temperature over said wet side surface whereby to evaporate portions of said water on said wet side surface to thereby moisten said air, extract heat from said water and cool said first and second exposed surfaces;
recovering cooled water from said wet side surface; and
discharging said moistened air.

14. The method of claim 13 in which said water is discharged for flow vertically downwardly along said heat exchanger wet side surface.

15. The method of claim 14 in which said air is flowed countercurrently to the flow of said water.

16. The method of claim 13 including the step of storing said cooled water and selectively discharging a portion of said stored cooled water across said wet side surface until the stored water reaches a substantially reduced temperature.

17. A method for cooling water, comprising:
discharging water across the wet side of a heat exchanger having opposite exposed surfaces defining wet and dry sides;
flowing air entirely across said dry side surface to cool said air to a first temperature and then flowing all of said cooled air at substantially said first temperature over said wet side surface whereby to evaporate portions of said water on said wet side surface to thereby moisten said air, extract heat from said water and cool said first and second exposed surfaces;
recovering cooled water from said wet side surface;
discharging said moistened air;
passing water to be cooled through a secondary heat exchanger;
using said cooled water which has been passed through the secondary heat exchanger for discharging across said wet side surface; and
flowing said moistened discharged air through said secondary heat exchanger whereby to cool water in said secondary heat exchanger and recover some of the water content of said discharged air.

* * * * *